May 11, 1926.

I. McK. BLOCH 1,584,073

INSTRUCTION ROLL

Filed June 14, 1922

May 11, 1926.
I. McK. BLOCH
INSTRUCTION ROLL
Filed June 14, 1922    4 Sheets-Sheet 2
1,584,073
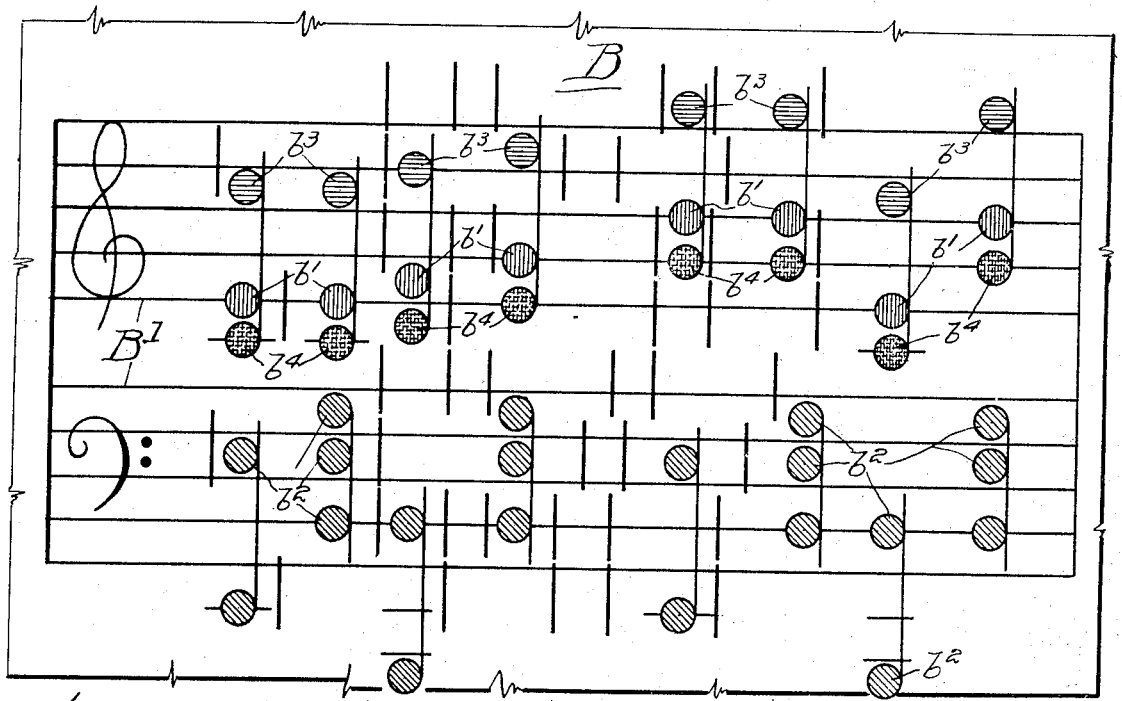
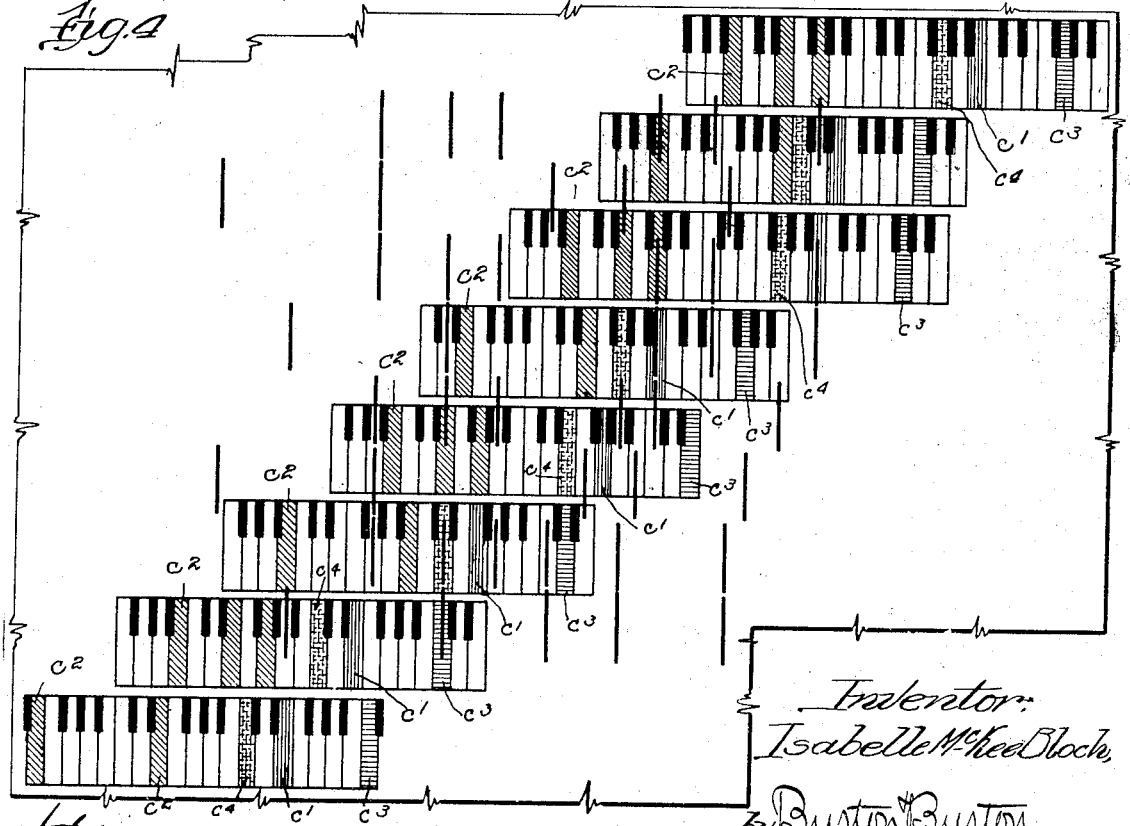
Inventor:
Isabelle McKee Bloch,
by Burton & Burton
her Attys.

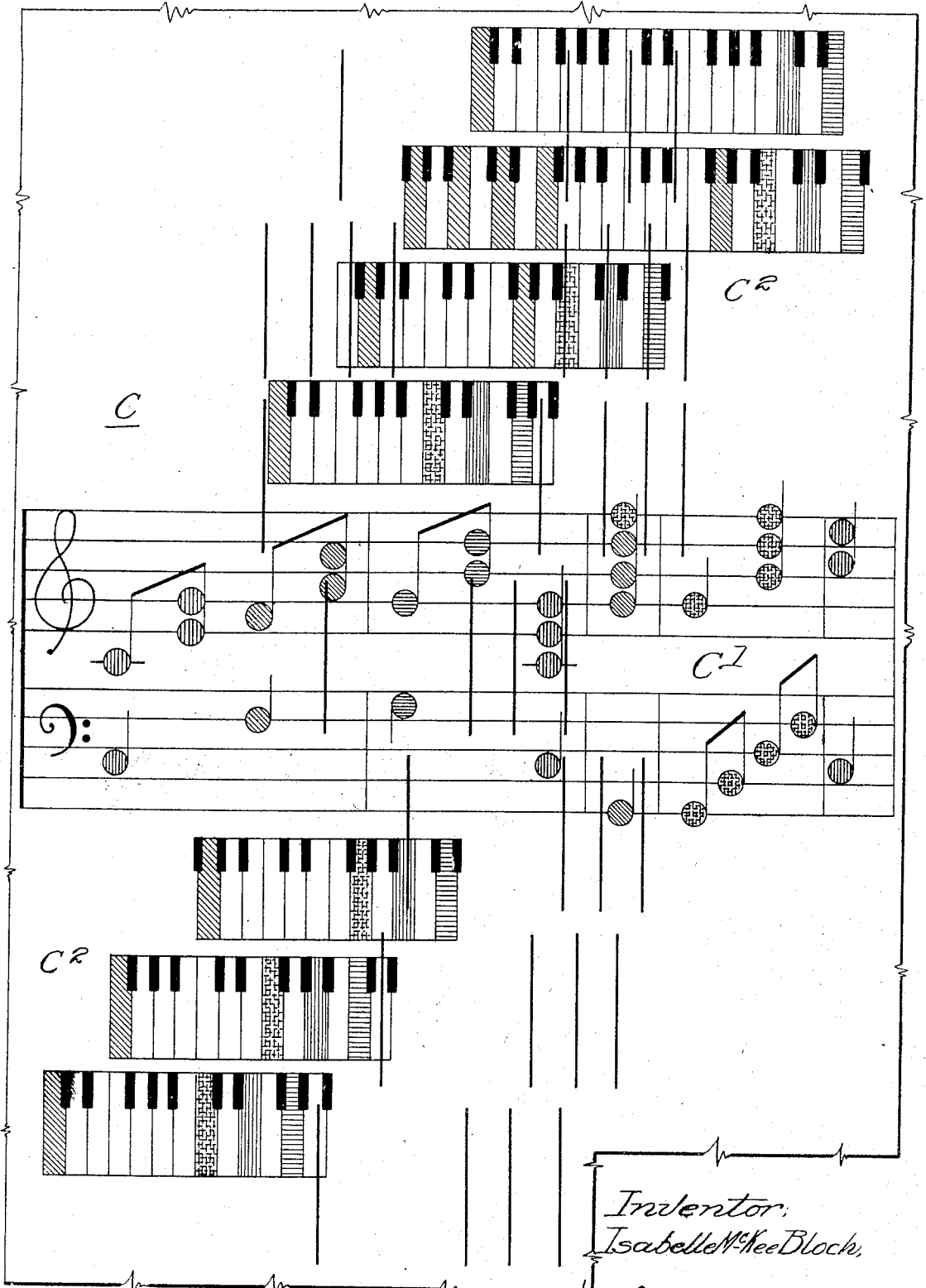

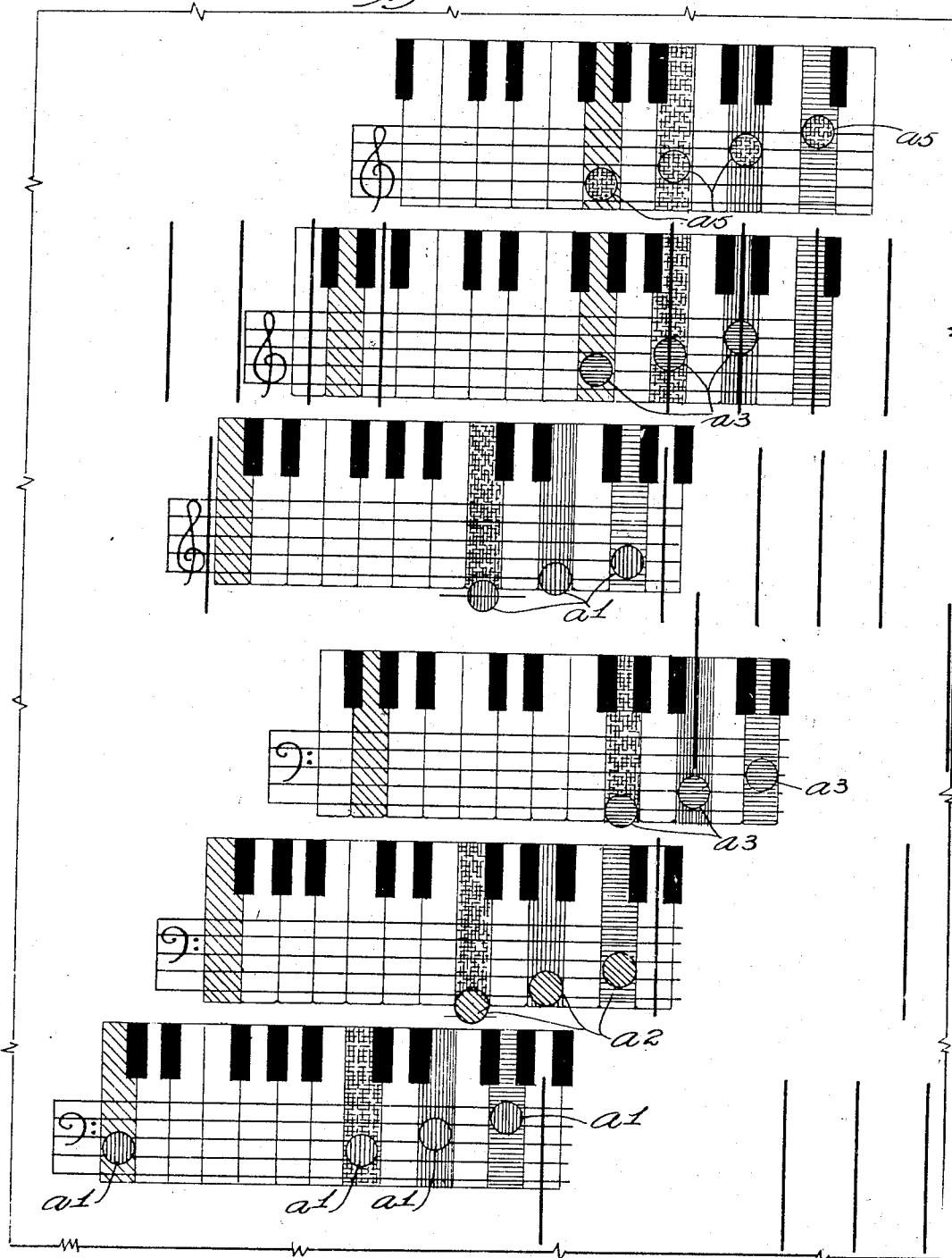

Patented May 11, 1926.

1,584,073

UNITED STATES PATENT OFFICE.

ISABELLE McKEE BLOCH, OF CHICAGO, ILLINOIS, ASSIGNOR TO THE Q. R. S. MUSIC COMPANY, OF CHICAGO, ILLINOIS, A CORPORATION OF ILLINOIS.

INSTRUCTION ROLL.

Application filed June 14, 1922. Serial No. 568,317.

The purpose of this invention is to provide an improved form of perforated note sheet or music roll, so-called, for automatic players, adapted to be utilized in connection with the player mechanism for giving musical instruction. It consists in the superficial elements and features shown and described, consisting in markings of staff notation printed upon and with relation to the perforated areas, as shown and described and as indicated in the claims.

In the drawings:—

Figures 3 and 4 show an advanced portion of the same note sheet, illustrating two uses of coloring for distinguishing the notes for different parts or instruments.

Figure 5 shows a further advanced portion of the note sheet illustrating the method of coloring both for distinguishing the chords and for distinguishing the notes for different parts or instruments.

Figure 6 shows a portion of the note sheet having delineation of manual keys, and also of staff notes, the latter being upon the former, the former being distinguished as to surface marking in groups for different parts and the latter being distinguished in chord groups.

The characteristic of this invention is, in general, that upon the perforated area of the note sheet or music roll for controlling the playing of an automatic musical instrument, there are imprinted at suitable places crosswise of said perforated area, delineations of staff notation, or delineations of recognizable fragments of the manual of a keyed instrument, as a piano or organ, the notes of the staff notation, or the delineation of the keys of the manual being differentiated from each other visually for the purpose of instructing the pupil as to the notes which belong together as constituting the same part, or the part to be played by the same instrument, or as belonging to the same chord.

Figure 1:
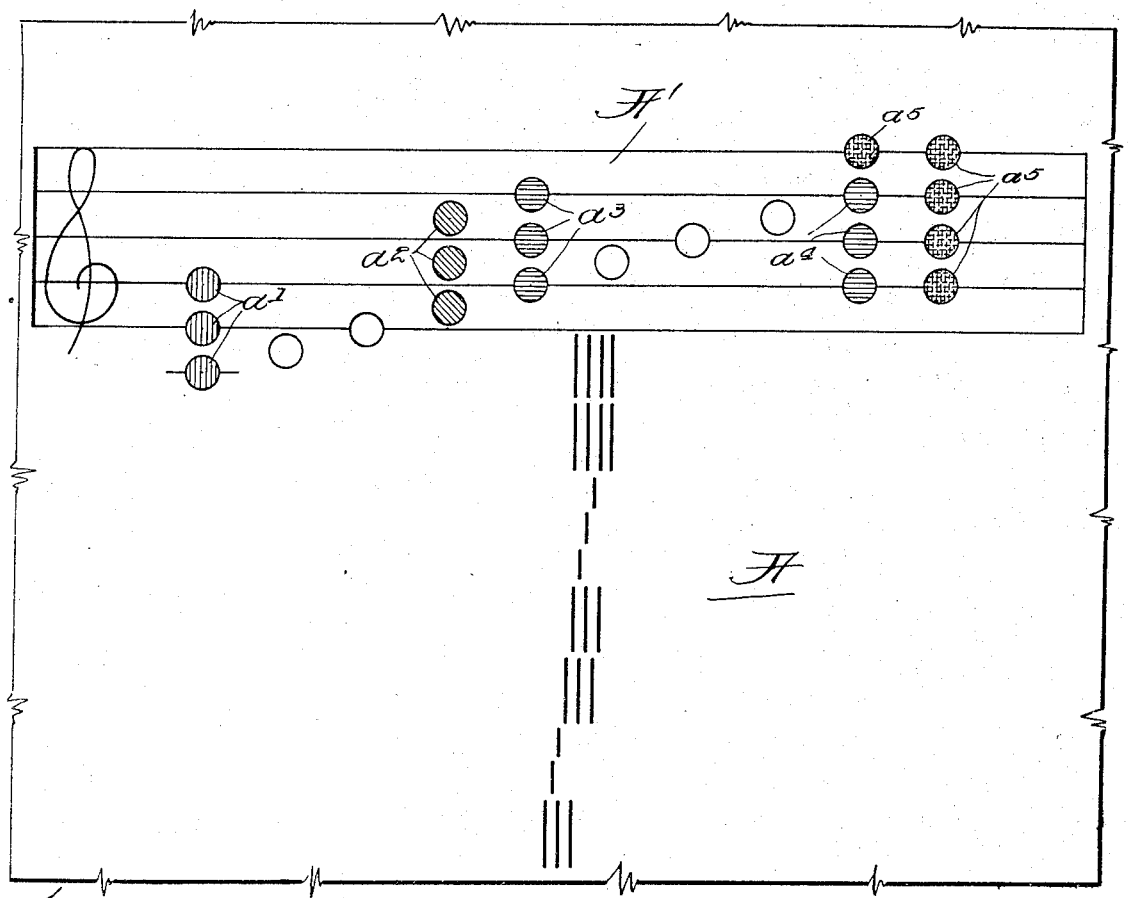
Figure 1 shows a portion of a perforated note sheet or music roll, having a feature which characterizes this invention, illustrating the use of coloring to distinguish different chords.

In Figure 1 there is shown a portion of the perforated note sheet, having imprinted upon the perforated area, A, thereof, the staff notation, $A^1$, having upon it the notes corresponding to the slots of the perforated area; the notes which belong to the same chord, being similarly presented, as by being of the same color or of other arbitrary marking, a different color or different style of marking being employed for the different chords. As shown, the notes of the group, $a^1$, constituting a tonic chord of the first degree are distinguished by the superficial marking which may be taken as signifying the color red. The notes of the group, $a^2$, belonging to the sub-dominant chord of the fourth degree, are identified together, distinguished from the notes of other chords, has superficial marking corresponding to the color green. The notes of group, $a^3$, belonging to the dominant chord of the fifth degree are distinguished by the superificial marking indicated by the color, blue. The notes of the group, $a^4$, constituting the chord of the dominant, seventh, comprising the three notes of the dominant fifth with the addition of the note, $a^5$, at the top, are distinguished by the superficial markings on the three notes which constitute the dominant chord or fifth degree, indicated by the color blue, the fourth note, $a^5$, being superficially marked to indicate the color yellow, or the entire group dominant seventh may be shown in yellow ($d^5$). It will be understood that the particular colors mentioned are not significant and that color, per se, is not significant, the invention merely requiring that the notes of the several chords shall be distinguished as belonging to those chords by distinguishable superficial markings.

Figure 2:
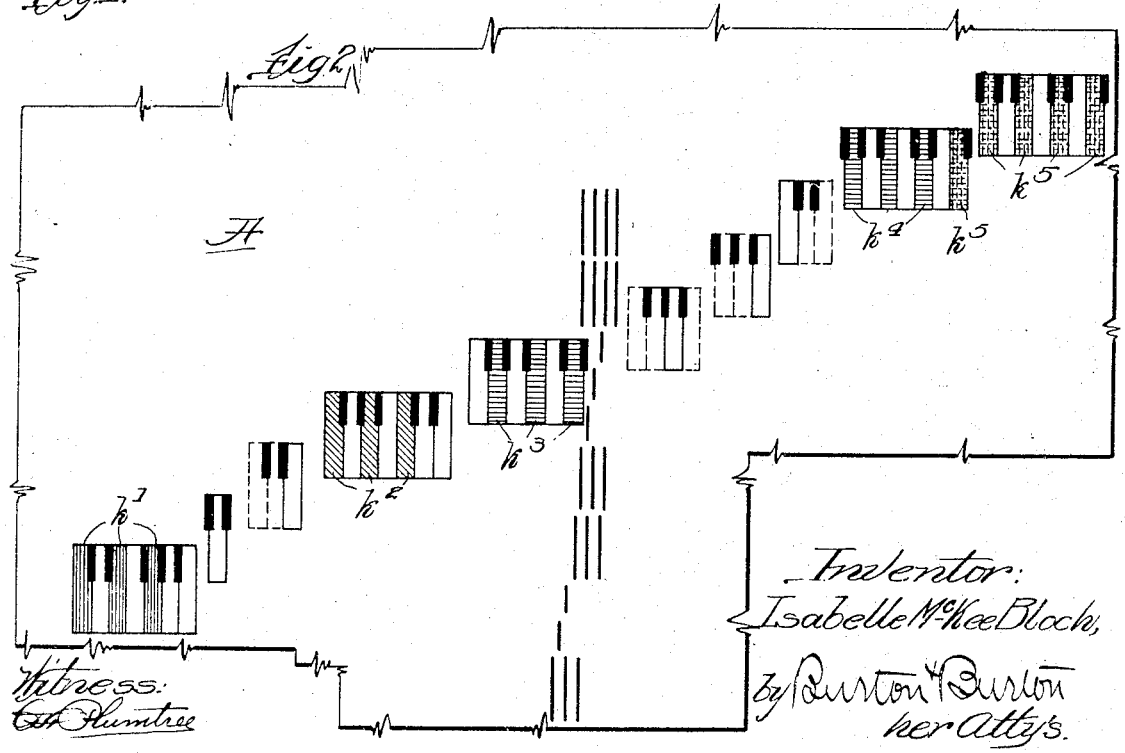
Figure 2 shows another portion of what may be understood to be the same perforated note sheet or music roll, having another feature characteristic of the invention, illustrating the use of coloring to distinguish chords and associate them with the manual keys of the keyed instrument on which the note sheet is used for automatic playing.

In Figure 2 the same method of distinguishing chords by color is applied by delineating upon the perforated area fragments of the manual of a keyed instrument, recognizable as to the keys shown by the grouping of black and white keys, the keys for the notes of the respective chords being distinguished by the same colorings as in the preceding figure, the keys, $k^1$, constituting the tonic chord being red, the keys, $k^2$, for sub-dominant chord or fourth degree being green, the keys, $k^3$, for the dominant chord of the fifth degree being blue, and the three keys, $k^4$, of the dominant fifth in the chord of dominant seventh being blue, the fourth,—dominant seventh,—$k^5$, being yellow, or all four keys, $k^5$, of the chord of dominant seventh being yellow.

In Figure 3 the principle of distinguishing notes which are to be associated, by similar superfical markings, is applied to the purpose of indicating the notes for different instruments or voices. In this figure the staff notations comprising a bass and treble cleff, $B^1$, are imprinted over a perforated area, B, whose cuttings are such as to play the notes of the imprinted staff notation. Thus, notes of group, $b^1$, which are for the violin part or corresponding voice, are distinguished from other groups and identified with each other by superficial markings indicating the color, red. And the notes of group, $b^2$, being those for the piano are identified with each other, and distinguished from the other groups by the superficial markings indicating the color green. The notes of group, $b^3$, which are for cornet or corresponding voice, are identified with each other and distinguished from the other groups by the superficial marking indicating the color, blue; and the notes of group, $b^4$, which are for cello or corresponding voice, are identified with each other and distinguished from the other groups by the superficial marking indicating the color, yellow.

In Figure 4 there is shown imprinted upon the perforated area which has the slots for playing the musical exercise or selection, delineations of fragments of the manual of a piano which are recognizable as to the keys represented by containing each two black keys, or three black keys, with the adjacent white keys, these manual fragment delineations being preferably imprinted so that the representation of the keys corresponding to the several slots are cut by those slots respectively, the notes for different instruments being distinguished by arbitrary differentiation of the imprint for delineating the key. In the pictorial representation, the delineation of the keys, $c^1$, for the violin are superficially shaded to indicate the color red; the keys, $c^2$, for the piano are superficially shaded to indicate the color green; the keys, $c^3$, for the cornet are superficially shaded to indicate the color, blue; the keys, $c^4$, for the clarinet are superficially shaded to indicate the color yellow.

In Figure 5 which shows illustration of method of coloring for distinguishing both chords and different parts or instruments, there is imprinted on the area, C, occupied by the perforations for playing a certain musical passage, the staff notation of the same at $C^1$, and pictorial delineation of fragments of the manual comprising the keys for playing the same at $C^2$. In the staff notation the notes constituting the several chords are distinguished by coloring as described with respect to Figure 1, and in the key delineations the keys for the notes belonging to different instruments or parts are distinguished by coloring as described with respect to Figure 4.

It will be understood that in this case, as in the case of the surface markings of the notes on the staff there is no particular significance to be attached to the choice of color or to the markings indicating color or consisting of color, rather than any other distinguishable surface markings.

In my co-pending application, Ser. No. 565,691, filed June 3, 1922, I have shown and claimed the expedient of having the notes of the staff notation imprinted upon the note sheet so as to be cut by the slots for playing said notes respectively, and this expedient is not claimed per se in this application; but it will be obvious that by the expedient of coloring the keys or staff notation notes which are thus cut by the corresponding slots for the several parts or instruments not only the notes constituting the respectively parts but also the slots for playing the part may be distinguished by the pupil.

It may be understood that under the term, "instruments" I include the human instrument,—the voice; and that in a composition adapted for vocalizing, notes for different voices will be distinguished in the same manner as above described with respect to compositions designed for playing different instruments. And in my claims I employ the word "parts" to indicate without distinction the parts for different instruments and the parts for different voices.

I claim:—

1. An orchestral instruction roll for utilizing automatic playing devices for teaching manual playing, having imprinted upon the perforate area delineation or fragments of the manual of a keyed instrument, the keys corresponding to the notes for different parts, being distinguished by arbitrary differentiation of the imprint for delineating the keys.

2. In the construction defined in claim 1, foregoing, the differentiation of the imprint of the keys being in respect to color.

3. In the construction defined in claim 1, foregoing, the delineation of manual keys being cut by the corresponding slots of the note sheets.

4. An instruction roll for utilizing automatic playing devices for teaching manual playing having imprinted upon the perforate area delineation of staff notation of the notes corresponding to the perforations respectively in said area, the notes for the different chord groups being distinguished by arbitrary differentiation of the imprint, —that is, the notes of each chord being similarly imprinted differently from every other chord.

5. A perforated note sheet or music roll for utilizing automatic playing devices for teaching manual playing, having fragments of the manual of a keyed instrument delineated upon the same, and having also fragments of staff notation imprinted thereon, with the staff notes corresponding to the slots respectively of the perforated note sheet imprinted upon the delineation of the corresponding manual keys, the notes for different instruments being distinguished by arbitrary differentiation of the imprint for delineation of the manual keys, and the note groups of different chords being distinguished by arbitrary differentiation of the imprint of the notes on the staff.

In testimony whereof, I have hereunto set my hand at Chicago, Illinois, this 5th day of June, 1922.

ISABELLE McKEE BLOCH.